United States Patent
Yue et al.

(10) Patent No.: US 11,366,568 B1
(45) Date of Patent: *Jun. 21, 2022

(54) IDENTIFYING AND RECOMMENDING EVENTS OF INTEREST IN REAL-TIME MEDIA CONTENT

(71) Applicant: Amazon Technologies, Inc., Seattle, WA (US)

(72) Inventors: Felicia Yue, Mukilteo, WA (US); Danny Ryan Stephens, Seattle, WA (US); Jeromey Russell Goetz, Seattle, WA (US); Zachary Christopher Mouri, Bothell, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/590,095

(22) Filed: Oct. 1, 2019

Related U.S. Application Data

(63) Continuation of application No. 15/187,052, filed on Jun. 20, 2016, now Pat. No. 10,489,016.

(51) Int. Cl.

| | |
|---|---|
| *G06F 3/0482* | (2013.01) |
| *H04N 21/482* | (2011.01) |
| *H04N 21/2387* | (2011.01) |
| *H04N 21/231* | (2011.01) |
| *G06F 16/735* | (2019.01) |
| *H04L 65/60* | (2022.01) |
| *G06F 3/04817* | (2022.01) |

(Continued)

(52) U.S. Cl.
CPC .......... *G06F 3/0482* (2013.01); *G06F 16/735* (2019.01); *H04L 65/60* (2013.01); *H04N 21/2387* (2013.01); *H04N 21/23106* (2013.01); *H04N 21/4826* (2013.01); *G06F 3/0488* (2013.01); *G06F 3/04817* (2013.01); *G06F 3/04842* (2013.01)

(58) Field of Classification Search
CPC .. G06F 3/0482; G06F 16/735; G06F 3/04842; G06F 3/04817; G06F 3/0488; H04N 21/2387; H04N 21/4826; H04N 21/23106; H04L 65/60
See application file for complete search history.

(56) References Cited

U.S. PATENT DOCUMENTS

| 7,220,910 B2 | 5/2007 | Plastina et al. |
| 7,962,942 B1 | 6/2011 | Craner |
| 8,412,772 B1 | 4/2013 | Nguyen et al. |

(Continued)

OTHER PUBLICATIONS

U.S. Appl. No. 13/404,459, filed Feb. 24, 2012, Non-Final Office Action dated Jun. 5, 2013.

(Continued)

*Primary Examiner* — Tuyetlien T Tran
(74) *Attorney, Agent, or Firm* — Thomas | Horstemeyer, LLP

(57) ABSTRACT

Disclosed are various embodiments for identifying and recommending events of interest in real-time media content. Video of a media content stream is analyzed to determine whether an event of interest is occurring in real-time. Upon determining that an event of interest is occurring in real-time, a user interface is generated that includes at least two concurrently visible options to begin viewing video content corresponding to the event of interest.

20 Claims, 8 Drawing Sheets

(51) Int. Cl.
*G06F 3/0488* (2022.01)
*G06F 3/04842* (2022.01)

(56) References Cited

U.S. PATENT DOCUMENTS

| | | | |
|---|---|---|---|
| 8,914,829 B2 | 12/2014 | White | |
| 9,565,481 B1* | 2/2017 | Bostick | H04N 21/25891 |
| 2002/0124252 A1* | 9/2002 | Schaefer | H04N 21/4722 |
| | | | 725/33 |
| 2002/0194002 A1 | 12/2002 | Petrushin | |
| 2003/0093789 A1* | 5/2003 | Zimmerman | H04H 60/13 |
| | | | 725/34 |
| 2003/0093790 A1 | 5/2003 | Logan et al. | |
| 2003/0105794 A1* | 6/2003 | Jasinschi | G06F 16/7834 |
| | | | 718/1 |
| 2003/0229900 A1 | 12/2003 | Reisman | |
| 2006/0008256 A1 | 1/2006 | Khedouri et al. | |
| 2008/0010372 A1 | 1/2008 | Khedouri et al. | |
| 2009/0141939 A1* | 6/2009 | Chambers | G06K 9/00771 |
| | | | 382/103 |
| 2010/0070992 A1 | 3/2010 | Morris et al. | |
| 2010/0113114 A1 | 5/2010 | Corbo | |
| 2010/0293566 A1 | 11/2010 | Valdez | |
| 2011/0035462 A1* | 2/2011 | Akella | H04N 21/47214 |
| | | | 725/87 |
| 2011/0040760 A1* | 2/2011 | Fleischman | H04N 21/812 |
| | | | 707/737 |
| 2011/0060742 A1 | 3/2011 | Heller et al. | |
| 2011/0162002 A1* | 6/2011 | Jones | H04N 21/812 |
| | | | 725/32 |
| 2011/0173194 A1 | 7/2011 | Sloo et al. | |
| 2011/0289534 A1 | 11/2011 | Jordan et al. | |
| 2012/0089911 A1 | 4/2012 | Hosking et al. | |
| 2012/0093481 A1* | 4/2012 | McDowell | G11B 27/28 |
| | | | 386/241 |
| 2012/0166950 A1* | 6/2012 | Frumar | H04N 21/6587 |
| | | | 715/719 |
| 2012/0224021 A1* | 9/2012 | Begeja | H04N 7/15 |
| | | | 348/E7.083 |
| 2012/0229629 A1* | 9/2012 | Blumstein-Koren | |
| | | | G06F 16/7837 |
| | | | 348/143 |
| 2012/0254917 A1 | 10/2012 | Burkitt et al. | |
| 2012/0320013 A1* | 12/2012 | Perez | H04N 21/632 |
| | | | 345/207 |
| 2014/0157307 A1* | 6/2014 | Cox | H04N 21/4331 |
| | | | 725/34 |
| 2014/0281004 A1* | 9/2014 | Bridges | H04N 21/4622 |
| | | | 709/231 |
| 2015/0058345 A1 | 2/2015 | Mishra et al. | |
| 2015/0154002 A1* | 6/2015 | Weinstein | G06F 40/109 |
| | | | 715/728 |
| 2015/0181301 A1* | 6/2015 | Bloch | H04N 21/4532 |
| | | | 725/41 |
| 2015/0365716 A1* | 12/2015 | Fonseca, Jr | G06K 9/00751 |
| | | | 725/41 |
| 2016/0100209 A1* | 4/2016 | Begeja | H04N 21/4828 |
| | | | 725/93 |
| 2016/0110877 A1* | 4/2016 | Schwartz | G06F 16/7867 |
| | | | 382/107 |
| 2016/0198229 A1* | 7/2016 | Keipert | H04N 21/4325 |
| | | | 725/12 |
| 2016/0274744 A1 | 9/2016 | Neumann et al. | |
| 2016/0277802 A1 | 9/2016 | Bernstein et al. | |
| 2016/0286244 A1 | 9/2016 | Chang et al. | |
| 2017/0017861 A1 | 1/2017 | Patil et al. | |
| 2017/0061314 A1* | 3/2017 | Schnurr | H04N 21/4316 |
| 2017/0085939 A1* | 3/2017 | Gupta | H04N 5/50 |
| 2017/0149704 A1* | 5/2017 | Batiz | H04L 51/10 |
| 2017/0193106 A1 | 7/2017 | Chang et al. | |
| 2017/0244959 A1* | 8/2017 | Ranjeet | G06T 7/292 |
| 2017/0366630 A1 | 12/2017 | Smith et al. | |
| 2019/0261064 A1* | 8/2019 | Ojala | H04N 21/8358 |

OTHER PUBLICATIONS

U.S. Appl. No. 13/404,459, filed Feb. 24, 2012, Response to Non-Final Office Action dated Jun. 5, 2013.
U.S. Appl. No. 13/404,459, filed Feb. 24, 2012, Final Office Action dated Jan. 31, 2014.
U.S. Appl. No. 13/404,459, filed Feb. 24, 2012, Response to Final Office Action dated Jan. 31, 2014.
U.S. Appl. No. 13/404,459, filed Feb. 24, 2012, Non-Final Office Action dated Oct. 1, 2014.
U.S. Appl. No. 13/404,459, filed Feb. 24, 2012, Response to Non-Final Office Action dated Oct. 1, 2014.
U.S. Appl. No. 13/404,459, filed Feb. 24, 2012, Final Office Action dated Apr. 9, 2015.
U.S. Appl. No. 13/404,459, filed Feb. 24, 2012, Response to Final Office Action filed Apr. 9, 2015.
U.S. Appl. No. 13/404,459, filed Feb. 24, 2012, Advisory Office Action dated Sep. 17, 2015.
U.S. Appl. No. 13/404,459, filed Feb. 24, 2012, Non-Final Office Action dated Feb. 26, 2016.
U.S. Appl. No. 13/404,459, filed Feb. 24, 2012, Response to Non-Final Office Action dated Feb. 26, 2016.
U.S. Appl. No. 13/404,459, filed Feb. 24, 2012, Final Office Action dated Aug. 19, 2016.
U.S. Appl. No. 13/404,459, filed Feb. 24, 2012, Response to Final Office Action dated Aug. 19, 2016.
U.S. Appl. No. 13/404,459, filed Feb. 24, 2012, Advisory Office Action dated Dec. 22, 2016.
U.S. Appl. No. 13/404,459, filed Feb. 24, 2012, Non-Final Office Action dated Jan. 26, 2017.
U.S. Appl. No. 13/404,459, filed Feb. 24, 2012, Response to Non-Final Office Action dated Jan. 26, 2017.
U.S. Appl. No. 13/404,459, filed Feb. 24, 2012, Final Office Action dated Jul. 20, 2017.
U.S. Appl. No. 13/404,459, filed Feb. 24, 2012, Response to Final Office Action dated Jul. 20, 2017.
U.S. Appl. No. 13/404,459, filed Feb. 24, 2012, Advisory Office Action dated Oct. 30, 2017.
U.S. Appl. No. 13/404,459, filed Feb. 24, 2012, Notice of Appeal filed on Nov. 13, 2017.
U.S. Appl. No. 13/404,459, entitled "Analyzing User Behavior Relative To Media Content," filed Feb. 24, 2012.
U.S. Appl. No. 13/404,459, filed Feb. 24, 2012, Notice of Allowance dated Apr. 23, 2018.

* cited by examiner

IDENTIFYING AND RECOMMENDING EVENTS OF INTEREST IN REAL-TIME MEDIA CONTENT

CROSS-REFERENCE TO RELATED APPLICATIONS

This application is a continuation of, and claims priority to, co-pending U.S. Patent Application entitled "IDENTIFYING AND RECOMMENDING EVENTS OF INTEREST IN REAL-TIME MEDIA CONTENT," filed on Jun. 20, 2016, and assigned application Ser. No. 15/187,052, which is incorporated herein by reference in its entirety.

BACKGROUND

The number of channels of streaming video content has greatly multiplied in recent years. Viewers now have the option to view hundreds of different channels, in addition to on-demand streaming of recorded content. In such a setting, it can be very difficult for viewers to find interesting content to watch. Also, in trying to find something to watch, viewers may miss important action in a live video stream.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to identifying and recommending events of interest in real-time media content, such as live video streams or audio streams. Because of the multiplicity of content sources now available, it is easy for a person to miss important events that are occurring in real-time. For example, a particular viewer usually would not be interested in watching a certain live news or sports channel, but because of an exciting event currently being shown or discussed, the particular viewer would be eager to tune in. Such live events may be associated with a high level of general interest (e.g., generally worthy to be discussed around a water cooler) or may be associated with a high level of user-specific interest. Typical electronic program guides may describe what is expected to occur in content, but they do not involve a real-time analysis and fail to indicate what is currently happening.

Various embodiments of the present disclosure describe approaches for automatic identification of live events of interest in real-time media content. Given the number of streams available, it is impractical to manually identify all live events of interest. The approaches described herein leverage algorithmic analysis of the content in combination with an analysis of metadata feeds to determine as quickly as possible that a live event of interest is occurring. Non-limiting examples of live events of interest may include breaking news events such as natural disasters, military actions, terrorist attacks, speeches, trial verdicts, or car chases, improbable or unexpected results in sporting events, first run broadcasts of popular shows, announcements of winners in contest shows, significant episodes in a series, and others. Events of interest may also be detected based on a topic of interest, which may be user defined in some cases. For example, a user may indicate that he or she may be interested in any content related to a certain actor, who is then considered a topic of interest. Detected events of interest may be surfaced via various user interfaces as will be described.

Figure 1A:
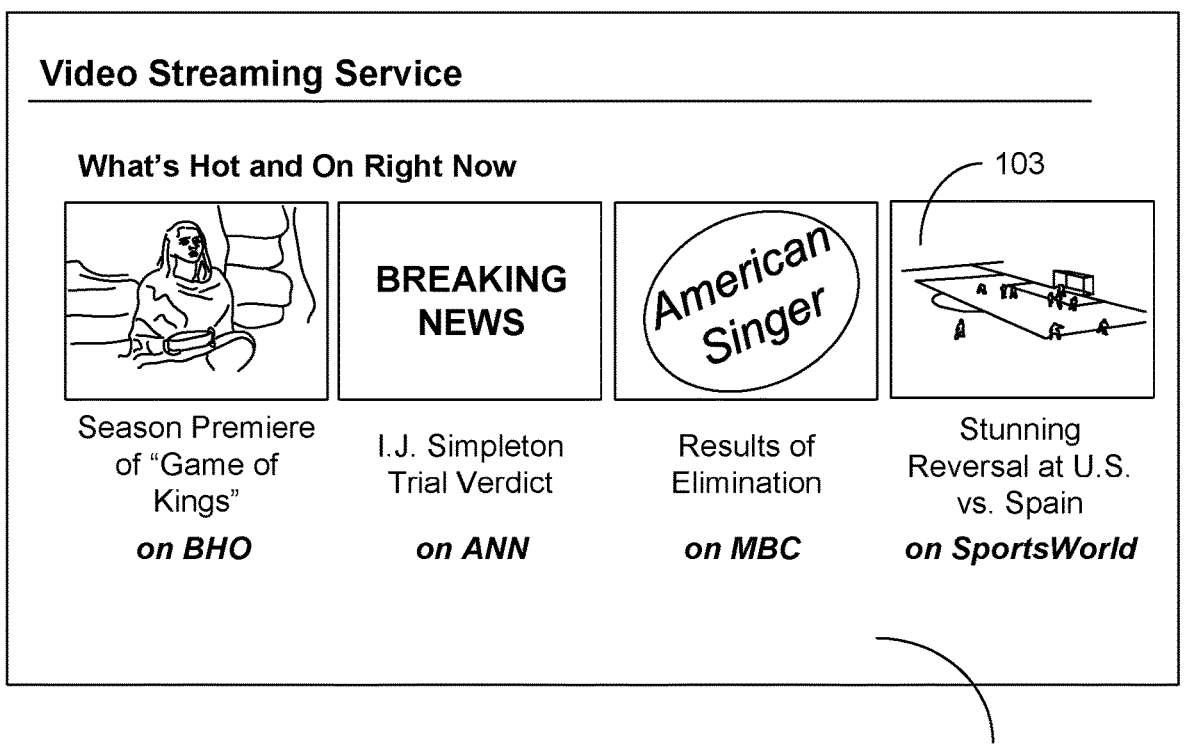
FIGS. 1A and 1B are drawings of example user interfaces that surface recommended events of interest in real-time media content according to embodiments of the present disclosure.

Referring now to FIG. 1A, shown is an example user interface 100 that surfaces recommended events of interest in real-time media content according to an embodiment of the present disclosure. Specifically, the user interface 100 may correspond to a home screen or a browsing screen for a video streaming service, and the user interface 100 may be rendered by a client device such as a television, a set-top box, a tablet, a smartphone, or any other device used to select media content. The user interface 100 includes a plurality of content recommendations 103 which correspond to events of interest that are occurring or have occurred recently in real-time media content.

The content recommendations 103 in this example recommend a first-run episode corresponding to a season premiere of a highly rated series titled "Game of Kings," a breaking news program currently showing a highly anticipated trial verdict, an episode of a singing contest show in which the results are about to be announced, and a stunning reversal of scores in a soccer game currently underway. Although four content recommendations 103 are shown in this example, a shoveler widget may be used to access additional content recommendations 103 not fitting within an initial screen of the user interface 100. The content recommendations 103 may be ranked or ordered according to an anticipated relevance to the user, significance of the events of interest, recency of the events of interest, and/or other factors. Color coding or other forms of emphasis may convey event significance, recency, or other information. For example, the user interface 100 may comprise a heat map indicating respective relevancies of multiple events of interest. The heat map may also indicate numbers of users who are consuming the media content including the events of interest. The heat map may indicate potential topics of interest as observed across multiple media content streams and allow for a user selection of a stream that combines portions from the multiple streams that contain events of interest that relate to the topic of interest.

In other examples, the content recommendations 103 may be organized according to genre or type of content (e.g., news, sports, popular television series, reality shows, etc.). Additional categories of content recommendations 103 not pertaining to events of interest in real-time media content may also be presented in the user interface 100, and these may be arranged according to genre or type of content (e.g., new releases, dramas, documentaries, etc.).

Figure 1B:
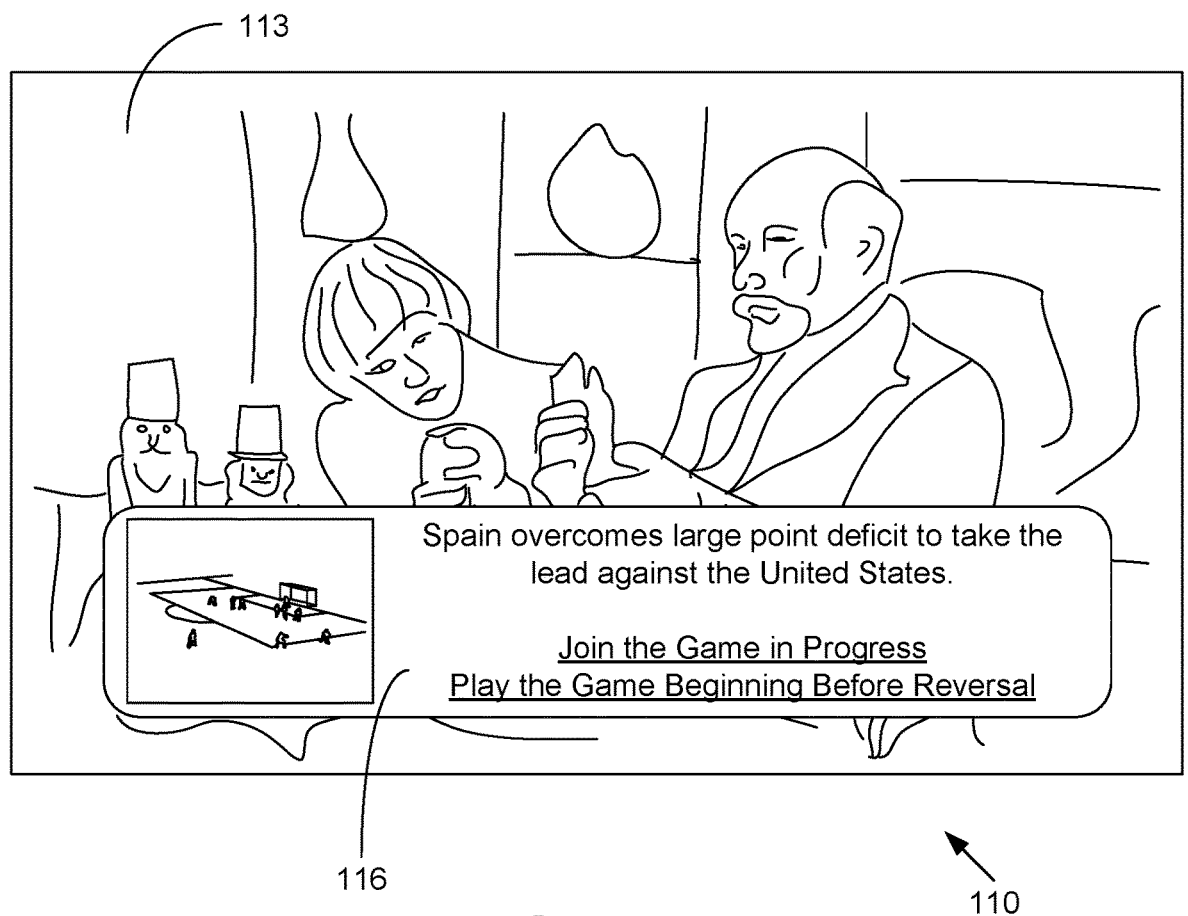

Turning now to FIG. 1B, shown is another example user interface 110 that surfaces recommended events of interest in real-time media content according to an embodiment of the present disclosure. In the user interface 110, a user is already watching video content 113 when it is determined that an event of interest is occurring in another video content stream. In this example, the event of interest corresponds to an unexpected reversal in a soccer match. Consequently, a user interface 116 is rendered as an overlay in this example to inform the user. In other examples, the user interface 116 may be rendered over the entire user interface 110, over a different portion of the user interface 110, or on a different display or through a different client device. In some cases, the information may be presented to the user via a social networking message, a text message, an email message, or a voice message via a networked audio device.

The user interface 116 explains the event of interest to the user, includes a thumbnail image, and presents options to begin viewing the corresponding video content. In a first option, the user is invited to join the video content stream in progress. However, by selecting this option, the user may miss some of the action relating to the event of interest, e.g., how the point reversal occurred. Thus, a second option is provided to play a recorded or cached version of the video content stream beginning at a point occurring before the event of interest. In this way, a user can catch up on what was missed. A third option may be provided to play the video content stream from the beginning of the current program, i.e., from the beginning of the soccer game.

Various thresholds or parameters may be configured to control what types of events are of sufficient interest to notify a given user through an approach that interrupts the user's current activities. In this scenario, the user may have previously demonstrated an interest in soccer or sports generally that warranted bringing this matter to his or her attention. If another user did not demonstrate an interest in sports, this particular event may not be considered interesting enough in order to interrupt the user's viewing experience for the video content 113. Ultimately, the event may not be of sufficient interest to the user, in which case the user may simply continue watching the video content 113. In the following discussion, a general description of the system and its components is provided, followed by a discussion of the operation of the same.

Figure 2:
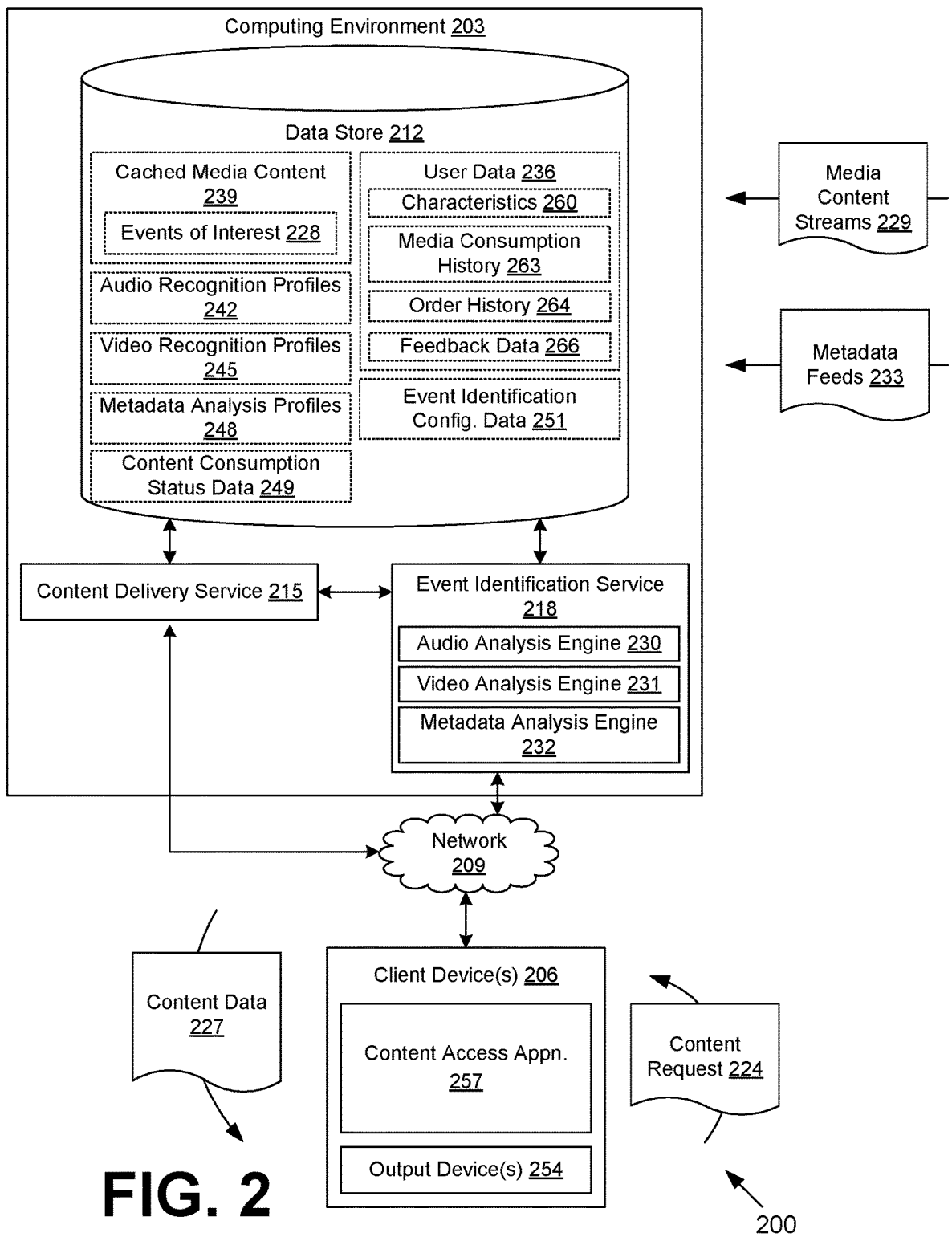
FIG. 2 is a schematic block diagram of a networked environment according to various embodiments of the present disclosure.

With reference to FIG. 2, shown is a networked environment 200 according to various embodiments. The networked environment 200 includes a computing environment 203 and one or more client devices 206, which are in data communication with each other via a network 209. The network 209 includes, for example, the Internet, intranets, extranets, wide area networks (WANs), local area networks (LANs), wired networks, wireless networks, cable networks, satellite networks, or other suitable networks, etc., or any combination of two or more such networks.

The computing environment 203 may comprise, for example, a server computer or any other system providing computing capability. Alternatively, the computing environment 203 may employ a plurality of computing devices that may be arranged, for example, in one or more server banks or computer banks or other arrangements. Such computing devices may be located in a single installation or may be distributed among many different geographical locations. For example, the computing environment 203 may include a plurality of computing devices that together may comprise a hosted computing resource, a grid computing resource, and/or any other distributed computing arrangement. In some cases, the computing environment 203 may correspond to an elastic computing resource where the allotted capacity of processing, network, storage, or other computing-related resources may vary over time.

Various applications and/or other functionality may be executed in the computing environment 203 according to various embodiments. Also, various data is stored in a data store 212 that is accessible to the computing environment 203. The data store 212 may be representative of a plurality of data stores 212 as can be appreciated. The data stored in the data store 212, for example, is associated with the operation of the various applications and/or functional entities described below.

The components executed on the computing environment 203, for example, include a content delivery service 215, an event identification service 218, and other applications, services, processes, systems, engines, or functionality not discussed in detail herein. The content delivery service 215 is configured to deliver media content over the network 209 for user consumption via the client devices 206. The media content comprises media items that may be consumed by users. For example, the media content may include video programs, video content series, movies, live streaming content, audiobooks, audio programs, podcasts and audio content series, electronic books and other electronic publications, or other items. The media content may be pre-produced or live in real-time, potentially with a delay or buffer.

The content delivery service 215 receives content requests 224 from client devices 206 and sends content data 227 to the client devices 206. In this regard, the content delivery service 215 may facilitate streaming of large content files or real-time live content via the network 209 to the client devices 206. Where the media content corresponds to electronic books or audio segments or other content of a sufficiently small size, the content delivery service 215 may deliver the entirety of the media content to the client device 206 to be stored on the client device 206 and presented to a user. The content delivery service 215 may also perform rights management functionality with respect to the media content.

The event identification service 218 is executed to identify events of interest 228 in media content streams 229 in real-time. To this end, the event identification services 218 may include multiple engines or modules, including an audio analysis engine 230, a video analysis engine 231, and a metadata analysis engine 232. The audio analysis engine 230 is executed to perform an analysis on audio of the media content streams 229 to detect audio that may be associated with an event of interest 228. The video analysis engine 231 is executed to perform an analysis on video of the media content streams 229 to detect video that may be associated with an event of interest 228. Finally, the metadata analysis engine 232 may perform an analysis on a plurality of metadata feeds 233 (e.g., social network feeds, news feeds, sports betting feeds, etc.) to identify an event of interest 228 and correlate it with a media content stream 229. Upon identifying an event of interest 228, the event identification service 218 may surface the event of interest 228 to users through user interfaces presented by way of the content delivery service 215 or by communication with other applications executed in the client devices 206 via the network 209.

The data stored in the data store 212 includes, for example, user data 236, cached media content 239, audio recognition profiles 242, video recognition profiles 245, metadata analysis profiles 248, content consumption status data 249, event identification configuration data 251, and potentially other data. The cached media content 239 corresponds to media content from a media content stream 229 that contains one or more events of interest 228. The cached media content 239 may be cached or recorded for a certain time in order for a user to see the media content from the beginning of a program or event and or to watch beginning relative to the event of interest 228. In some cases, a user may be able to watch a summary of the cached media content 239 focusing on time periods containing events of interest 228, and possibly playing other portions of content at an increased playback speed.

The audio recognition profiles 242 contain data that enable recognition of events of interest 228 in audio content from a media content stream 229. For example, the audio recognition profiles 242 may include tone characteristics, volume characteristics, pitch characteristics, or other characteristics for which a speaker's voice can be analyzed to determine whether a speaker is speaking in an excited manner, which can indicate an event of interest 228. For example, a speaker's manner of speaking may grow louder, with a change in tone and pitch, when the speaker is excited.

Also, a speaker may repeat words multiple times when excited (e.g., "the Warriors win! the Warriors win!"). The content of the speaker's speech may also be analyzed for certain predefined key words or phrases in a content dictionary that indicate an occurrence of an event of interest 228 (e.g., "won the championship," "oh my goodness," "I can't believe it," etc.). In some embodiments, the audio recognition profiles 242 may be normalized or adapted for each individual speaker. For example, a certain sportscaster may have a usual excited speech pattern that does not indicate an event of interest 228, while a certain low-key newscaster speaking in the same manner would indicate an event of interest 228. To this end, audio recognition profiles 242 may be maintained individually for multiple possible speakers, and voice recognition may be used to correlate a speaker to his or her individually tailored audio recognition profile 242.

Sounds other than speech may also be profiled. For example, an explosion or gunfire may indicate an event of interest 228. A detection of such a sound may be correlated with a cached media content 239 and surfaced to the user as an event of interest 228.

The video recognition profiles 245 enable the recognition of video from the media content streams 229 that depict an event of interest 228. In one embodiment, the video recognition profiles 245 may contain signatures or profiles of images that correspond to known types of events of interest 228. For example, car chases shown by news programming may look relatively similar, with a road being shown from overhead and a moving vehicle being tracked. Parameters relating to color, movement, shapes, etc., may be extracted from video of one or more such incidents, and the parameters may control detection of similar incidents in future media content streams 229.

In another embodiment, optical character recognition upon the video may be employed to detect text indicating an event of interest 228. For example, news programming may have captions such as "breaking news" in red, bold text, which may indicate an event of interest 228. Therefore, the video recognition profiles 245 may record text content (e.g., words, phrases, sentences, etc.) and text styles (e.g., text size, text color, etc.) associated with events of interest 228.

The metadata analysis profiles 248 enable the recognition of events of interest 228 in media content by analyzing metadata feeds 233 such as social network feeds, news feeds, sports betting feeds, and so on. In one example, if a social network feed suddenly explodes with comments regarding a particular media content program or person or character featured therein, an event of interest 228 may be determined and correlated with the cached media content 239. In another example, if the odds completely reverse for a sports match as reflected in a sports betting feed, the action in the corresponding sports program may be unexpected and sudden, which may be deemed an event of interest 228. Likewise, a news feed associated with a news channel may include text indicating an event of interest 228 (e.g., "plane crash," "missile strike," etc.), which can then be correlated with the news channel and surfaced as an event of interest 228.

Approaches to crowdsourcing the identification of significant portions of media content are described in U.S. patent application Ser. No. 13/404,459, entitled "ANALYZING USER BEHAVIOR RELATIVE TO MEDIA CONTENT," filed on Feb. 24, 2012, which is incorporated herein by reference in its entirety.

The content consumption status data 249 may indicate numbers of users who are currently consuming media content streams 229. Relative popularity in this regard may signal the presence of an event of interest 228 in a corresponding media content stream 229. For example, if a breaking news event occurs, a news channel may have a spike in viewership.

The user data 236 may include a variety of data regarding users that may be leveraged by the event identification service 218 in personalizing the detection and surfacing of events of interest 228. To this end, the user data 236 may include characteristics 260, a media consumption history 263, an order history 264, feedback data 266, and/or other data. The characteristics 260 may include any characteristic of the user that may have a bearing on what types of events of interest 228 would be viewed as most helpful or relevant to the particular user. For example, the characteristics 260 may include age, gender, location, etc.

The media consumption history 263 tracks the user's consumption habits with respect to the media content. This may track the user's interests, such as sports, news, reality television, etc., so that only events of interest 228 that are deemed relevant to the user are actually promoted to the user. The order history 264 may describe a plurality of orders for items via an electronic commerce system or brick-and-mortar sources. The orders may include items purchased, leased, downloaded, or otherwise obtained for consumption. The items may include products, goods, services, media content items, software items, or other types of items. An analysis of the order history 264 for a user may reveal additional preferences for personalizing what events of interest 228 are presented to the user and/or by what presentation approach. For instance, the order history 264 may indicate purchases of media content in a user's media content library, where the user has not yet played the media content.

The feedback data 266 may indicate implicit or explicit feedback from the user regarding events of interest 228 that were presented to the user. The feedback data 266 indicating whether the user liked or disliked the event of interest 228 may be used to control how future events of interest 228 are detected or presented for the particular user and/or other users.

The event identification configuration data 251 includes thresholds, factor weights, and/or other parameters used to control the real-time identification of the events of interest 228. The parameters may also take into account personalization factors extracted from the user data 236, such as genres favored in the media consumption history 263 or the order history 264, location of the user from the characteristics 260, and so on. The parameters in the event identification configuration data 251 may be manually established and/or set automatically via machine learning approaches. In some scenarios, thresholds for identification of events of interest 228 may be increased based upon a high current consumption of the metadata content stream 229 as indicated in the content consumption status data 249.

The client device 206 is representative of a plurality of client devices that may be coupled to the network 209. The client device 206 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, smartwatches, head mounted displays, or other devices. The client device 206 may include one or more output devices 254 such as a display and a sound device. The display may comprise, for example, one or more devices such as liquid crystal display (LCD) displays, gas plasma-based flat panel displays, organic light emitting diode (OLED) displays, electrophoretic ink (E ink) displays, LCD projectors, or other types of display devices, etc.

The client device 206 may be configured to execute various applications such as a content access application 257 and/or other applications. The content access application 257 may be executed to send content requests 224 over the network 209 to the content delivery service 215 and to receive content data 227. The content access application 257 may then render the content data 227 for presentation to a user via one or more output devices 254. The content data 227 may include media content as well as user interfaces that present the events of interest 228 for selection by the user. The client device 206 may be configured to execute applications beyond the content access application 257 such as, for example, browsers, email applications, social networking applications, word processors, spreadsheets, and/or other applications.

Figure 3:
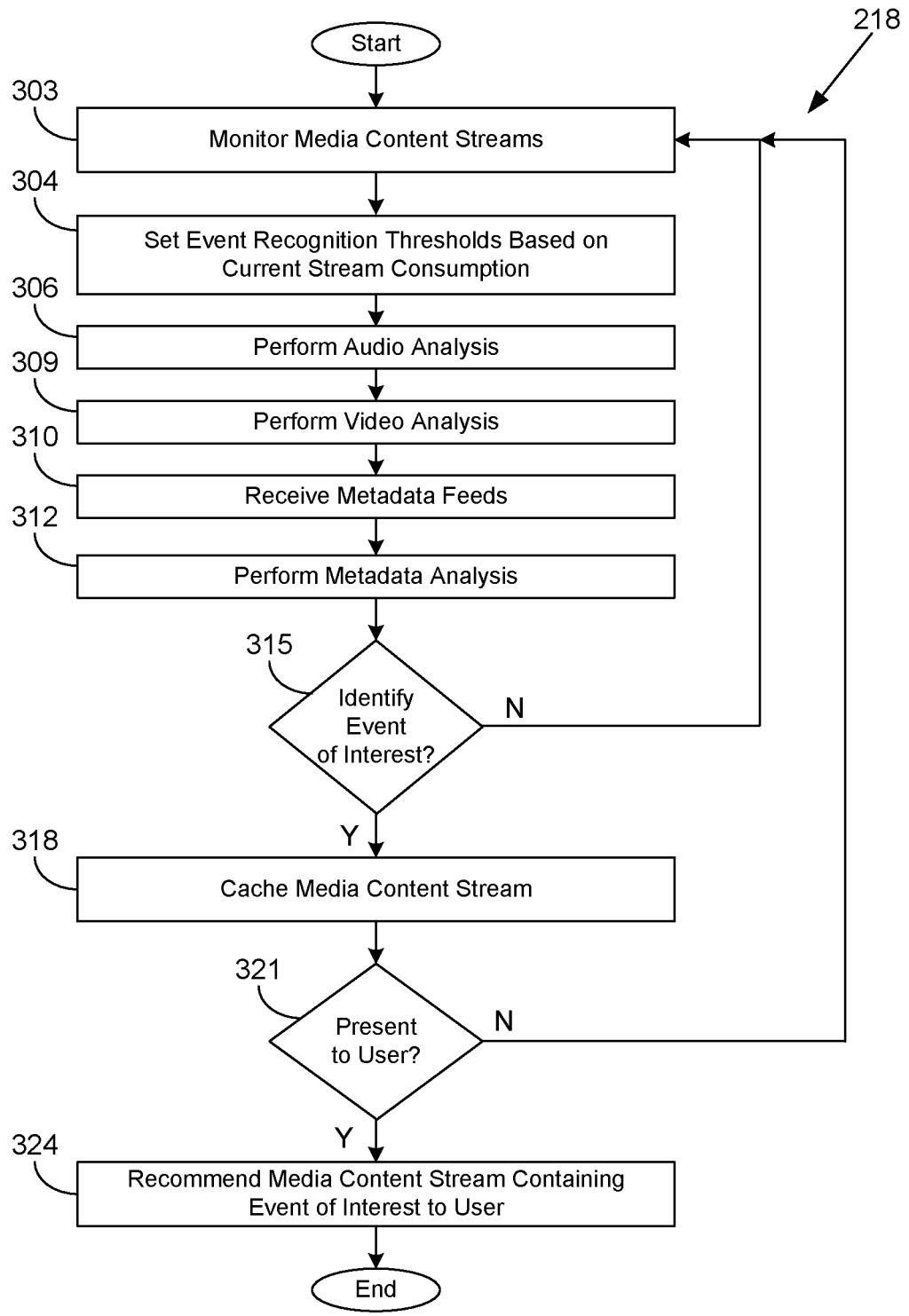
FIG. 3 is a flowchart illustrating one example of functionality implemented as portions of an event identification service executed in a computing environment in the networked environment of FIG. 2 according to various embodiments of the present disclosure.

Moving on to FIG. 3, shown is a flowchart that provides one example of the operation of a portion of the event identification service 218 according to various embodiments. It is understood that the flowchart of FIG. 3 provides merely an example of the many different types of functional arrangements that may be employed to implement the operation of the portion of the event identification service 218 as described herein. As an alternative, the flowchart of FIG. 3 may be viewed as depicting an example of elements of a method implemented in the computing environment 203 (FIG. 2) according to one or more embodiments.

Beginning with box 303, the event identification service 218 monitors a plurality of different media content streams 229 (FIG. 2) in real-time that are available to client devices 206 (FIG. 2) via the content delivery service 215 (FIG. 2). For example, these media content streams 229 may correspond to video channels, audio channels, or other streams. In box 304, the event identification service 218 may set event recognition thresholds from the event identification configuration data 251 (FIG. 2) based at least in part on a level of current consumption for individual media content streams 229 as indicated by the content consumption status data 249 (FIG. 2). In box 306, the event identification service 218 performs an audio analysis on the media content streams 229 using the audio analysis engine 230 (FIG. 2), which may or may not identify an event of interest 228 (FIG. 2) in the audio of the media content streams 229. The operation of the audio analysis engine 230 is described in further detail with reference to the flowchart of FIG. 4.

In box 309, the event identification service 218 performs a video analysis on the media content streams 229 using the video analysis engine 231 (FIG. 2), which may or may not identify an event of interest 228 in the video of the media content streams 229. The operation of the video analysis engine 231 is described in further detail with reference to the flowchart of FIG. 5. In box 310, the event identification service 218 receives one or more metadata feeds 233 (FIG. 2) from external sources such as social networks, web sites, betting sites, and so on. In box 312, the event identification service 218 performs an analysis on the metadata feeds 233 using the metadata analysis engine 232 (FIG. 2), which may or may not identify an event of interest 228 that can be correlated to a media content stream 229. The operation of the metadata analysis engine 232 is described in further detail with reference to the flowchart of FIG. 6.

In box 315, from the analyses performed in boxes 306, 309, and 312, the event identification service 218 determines whether an event of interest 228 is identified in the media content streams 229. If no event of interest 228 is identified, the event identification service 218 returns to box 303 and continues monitoring the media content streams 229. If, however, an event of interest 228 is identified, the event identification service 218 moves to box 318 and caches the media content stream 229 as the cached media content 239 (FIG. 2) to allow for replaying the event of interest 228.

In box 321, the event identification service 218 determines whether to present the event of interest 228 to a specific user. For example, the event identification service 218 may refer to the user data 236 (FIG. 2) to determine whether the user would like or would not like to be informed of this event of interest 228. If the event of interest 228 is not to be presented to the user, the event identification service 218 returns to box 303 and continues monitoring media content streams 229. The event identification service 218 could potentially recommend the event of interest 228 to other users with different user data 236.

If the event identification service 218 elects to present the event of interest 228 to the user, the event identification service 218 moves to box 324 and recommends the media content stream 229 containing the event of interest 228 to the user. For example, the event identification service 218 may send a notification to the user via email, text message, social media message, or another approach. Alternatively, the event identification service 218 may generate user interfaces such as those in FIG. 1A or 1B that inform the user of the event of interest 228 and allow the user to select and consume the media content stream 229 that includes the event of interest 228.

The manner of presentation may depend on the type of event of interest 228 and the type of media content reflected in the media content stream 229. For example, it may be desirable not to recommend a media content stream 229 in connection with a description that is a "spoiler," such as a winner's name or face, a final score for a sporting event, etc. In some scenarios, the events of interest 228 may be stored long-term in connection with the cached media content 239. In this regard, the events of interest 228 may serve as bookmarks or a navigational aid for important portions of the cached media content 239. Thereafter, the operation of the portion of the event identification service 218 ends.

Figure 4:
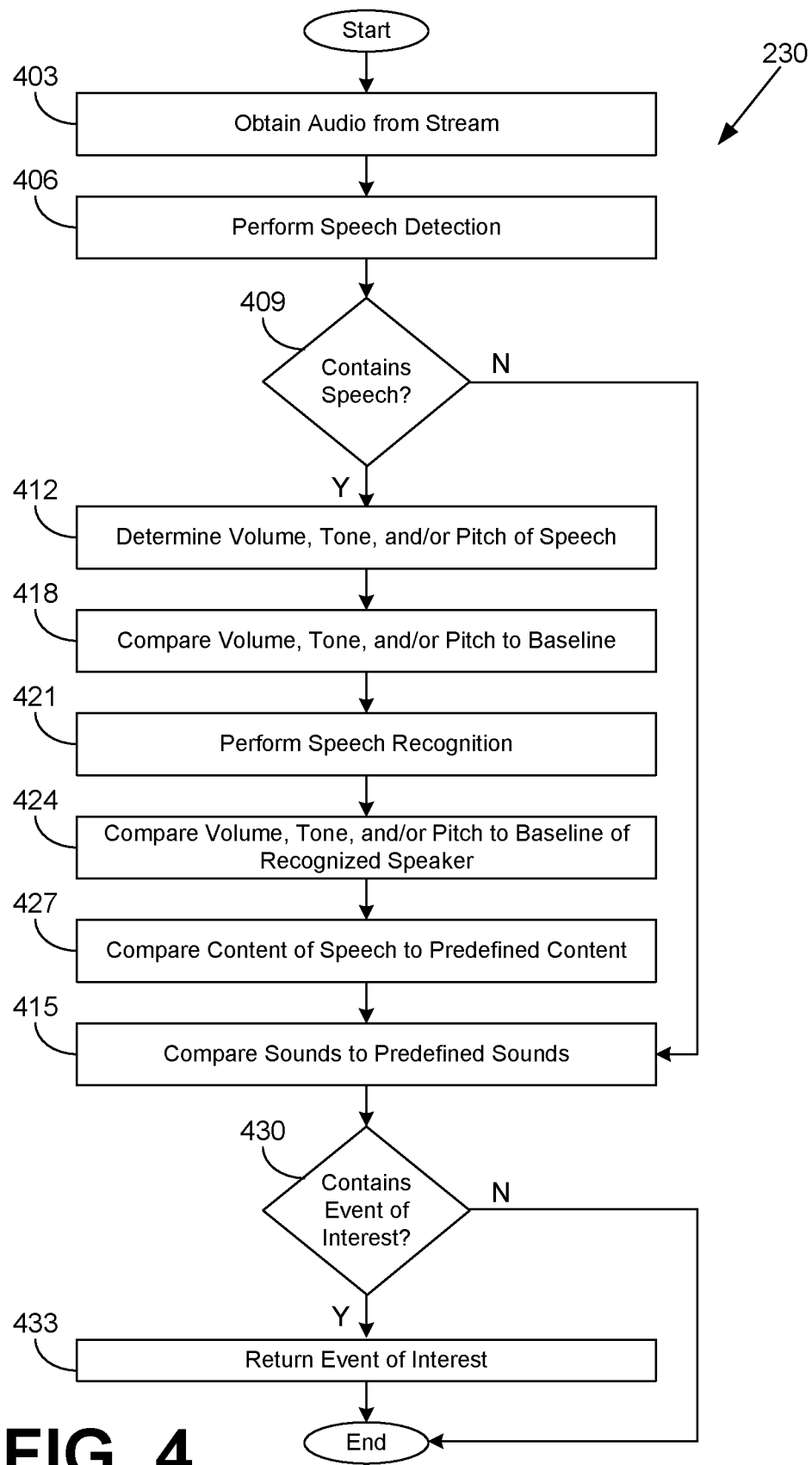
FIG. 4 is a flowchart illustrating one example of functionality implemented as portions of an audio analysis engine executed in a computing environment in the networked environment of FIG. 2 according to various embodiments of the present disclosure.

Continuing now to FIG. 4, shown is a flowchart that provides one example of the operation of a portion of the audio analysis engine 230 according to various embodiments. It is understood that the flowchart of FIG. 4 provides merely an example of the many different types of functional arrangements that may be employed to implement the operation of the portion of the audio analysis engine 230 as described herein. As an alternative, the flowchart of FIG. 4 may be viewed as depicting an example of elements of a method implemented in the computing environment 203 (FIG. 2) according to one or more embodiments.

Beginning with box 403, the audio analysis engine 230 obtains audio from a media content stream 229 (FIG. 2). In box 406, the audio analysis engine 230 performs speech detection on the audio. In box 409, the audio analysis engine 230 determines whether the audio contains speech according to the speech detection. If the audio does contain speech, the audio analysis engine 230 continues from box 409 to box 412. If the audio does not contain speech, the audio analysis engine 230 instead moves from box 409 to box 415.

In box 412, the audio analysis engine 230 determines the volume, tone, pitch, and/or other characteristics of the speech. In box 418, the audio analysis engine 230 compares the determined volume, tone, pitch, and/or other characteristics to baseline characteristics in the audio recognition profiles 242 (FIG. 2) to determine whether the speaker is speaking in an unusually excited manner, which may indicate an event of interest 228 (FIG. 2) is occurring.

In box 421, the audio analysis engine 230 performs speech recognition to determine what is said and/or who is speaking. In some scenarios, the fact that a certain person is speaking may indicate an event of interest 228 tied to a predefined topic of interest, e.g., the person who is speaking. Also, if the topic of interest is mentioned (e.g., the name of a certain person of interest), an event of interest 228 may be detected. In box 424, the audio analysis engine 230 compares the volume, tone, pitch, repetition, speed, and/or other characteristics of the speech to a baseline of the recognized speaker in the audio recognition profiles 242. For example, a certain speaker may be known for an excitable, repetitious delivery, while another speaker may be known for a relaxed, clear delivery, so the characteristics of the speech may be considered with reference to the particular speaker (i.e., be normalized for the particular speaker) to determine whether it is out of the ordinary.

In box 427, the audio analysis engine 230 compares the content of the speech to predefined content in the audio recognition profiles 242 that may indicate an event of interest 228. For example, certain words, phrases, sentences, repetitions of words, or other speech content may be indicative of an event of interest 228. In box 415, the audio analysis engine 230 compares sounds in the audio to signatures or profiles of predefined sounds in the audio recognition profiles 242. For example, gunshots, explosions, etc., may have an identifiable signature and may be indicative of an event of interest 228. Also, some programs may be associated with a certain type of sound before an event of interest 228. For example, the announcement of results from a reality show contest may be preceded by applause followed by a predefined amount of silence. Detecting this applause followed by the silence may thus indicate an event of interest 228.

In box 430, the audio analysis engine 230 determines whether the audio will be deemed to contain an event of interest 228. This determination may be with reference to various thresholds and weighted combinations as specified in the event identification configuration data 251 (FIG. 2). If no event of interest 228 is found, the operation of the audio analysis engine 230 ends. If the audio analysis engine 230 determines that an event of interest 228 is found, the audio analysis engine 230 returns the event of interest 228 in box 433. Thereafter, the operation of the portion of the audio analysis engine 230 ends.

Figure 5:
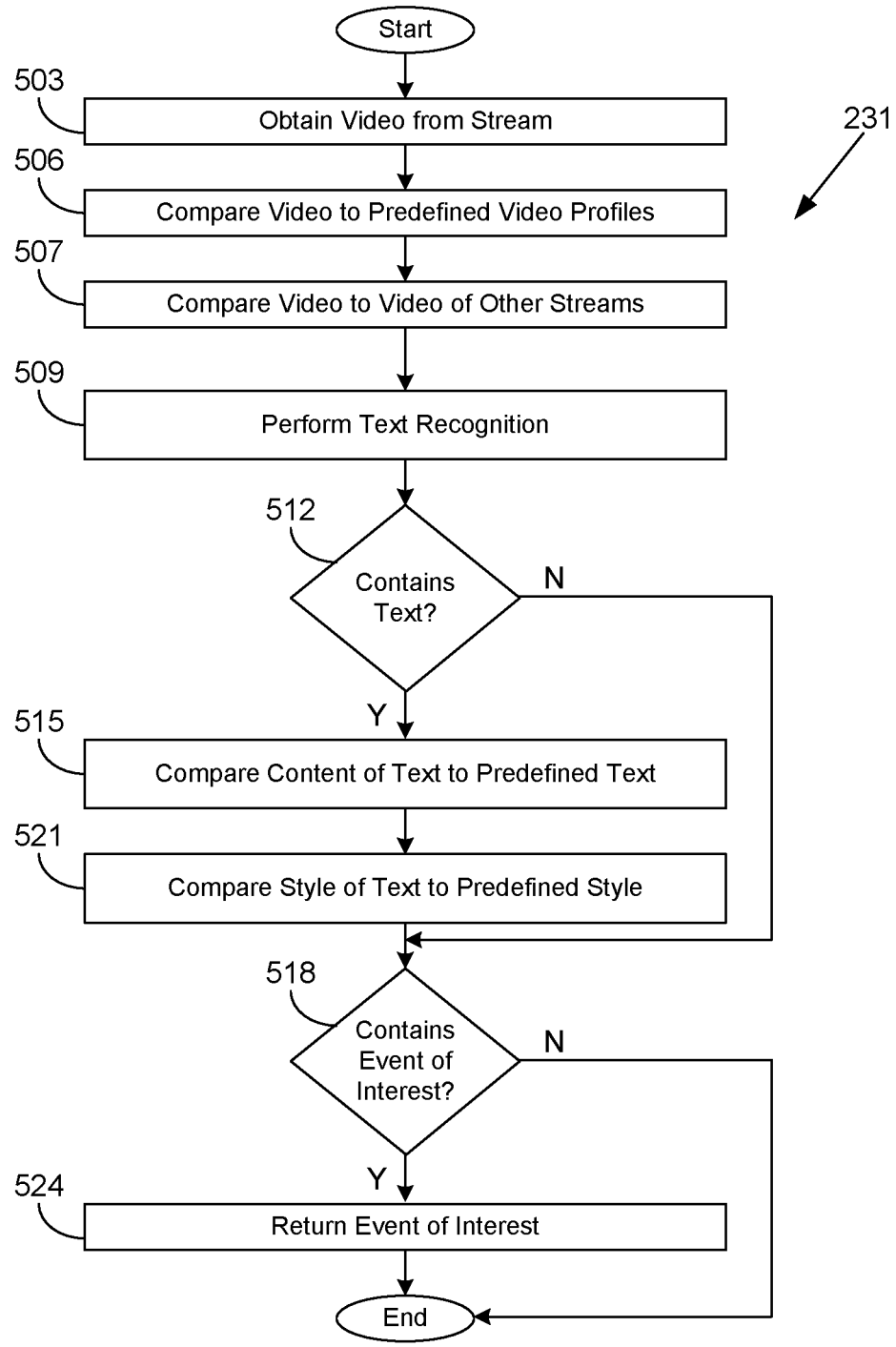
FIG. 5 is a flowchart illustrating one example of functionality implemented as portions of a video analysis engine executed in a computing environment in the networked environment of FIG. 2 according to various embodiments of the present disclosure.

Referring next to FIG. 5, shown is a flowchart that provides one example of the operation of a portion of the video analysis engine 231 according to various embodiments. It is understood that the flowchart of FIG. 5 provides merely an example of the many different types of functional arrangements that may be employed to implement the operation of the portion of the video analysis engine 231 as described herein. As an alternative, the flowchart of FIG. 5 may be viewed as depicting an example of elements of a method implemented in the computing environment 203 (FIG. 2) according to one or more embodiments.

Beginning with box 503, the video analysis engine 231 obtains video from a media content stream 229 (FIG. 2). In box 506, the video analysis engine 231 compares the video to one or more predefined video profiles in the video recognition profiles 245 (FIG. 2). An image recognition analysis may be used to determine whether an object in the video, with a certain movement, shape, color, etc., corresponds to a profile. For example, the video analysis engine 231 may compare the video to a car chase profile to see if the video likely displays a car chase, which may be deemed an event of interest 228. Also, the video analysis engine 231 may determine whether the video corresponds to a certain lighting or camera pattern that is associated with an expected event (e.g., a predictable camera pattern and lighting that precedes announcements of results in a competition).

The analysis performed may relate to detecting whether an event of interest 228 is present that relates to a certain topic. For example, facial recognition may determine that a certain person is being shown or interviewed in the video. In another example, a location or scene may be detected, where the location is a topic of interest.

In box 507, the video analysis engine 231 compares the video to video of shown currently or recently in other media content streams 229. For example, video of a breaking news event may be shown simultaneously on many different channels. The showing of the same video, or similar video depicting a building, vehicle, person, or other objects, by multiple media content streams 229 may be an indicator of an event of interest 228.

In box 509, the video analysis engine 231 performs text recognition on the video. In box 512, the video analysis engine 231 determines whether the video contains text according to the text recognition. If so, the video analysis engine 231 continues from box 512 to box 515. If it does not, the video analysis engine 231 instead proceeds from box 512 to box 518.

In box 515, the video analysis engine 231 compares the content of the identified text to predefined text in the video recognition profiles 245. For example, the video analysis engine 231 may determine whether the video displays the text "breaking news." In some cases, the predefined text may be determined to relate to a topic of interest, such as an actor's name or other topics. In box 521, the video analysis engine 231 compares the presentation style of the text with a predefined presentation style that is associated with events of interest 228. For example, large text in a red color may be deemed a style associated with events of interest 228. Such determinations may be channel-specific or media stream-specific.

In box 518, the video analysis engine 231 determines whether the video will be deemed to contain an event of interest 228. This determination may be with reference to various thresholds and weighted combinations as specified in the event identification configuration data 251 (FIG. 2). If no event of interest 228 is found, the operation of the portion of the video analysis engine 231 ends. If the video analysis engine 231 determines that an event of interest 228 is found, the video analysis engine 231 returns the event of interest 228 in box 524. Thereafter, the operation of the portion of the video analysis engine 231 ends.

Figure 6:
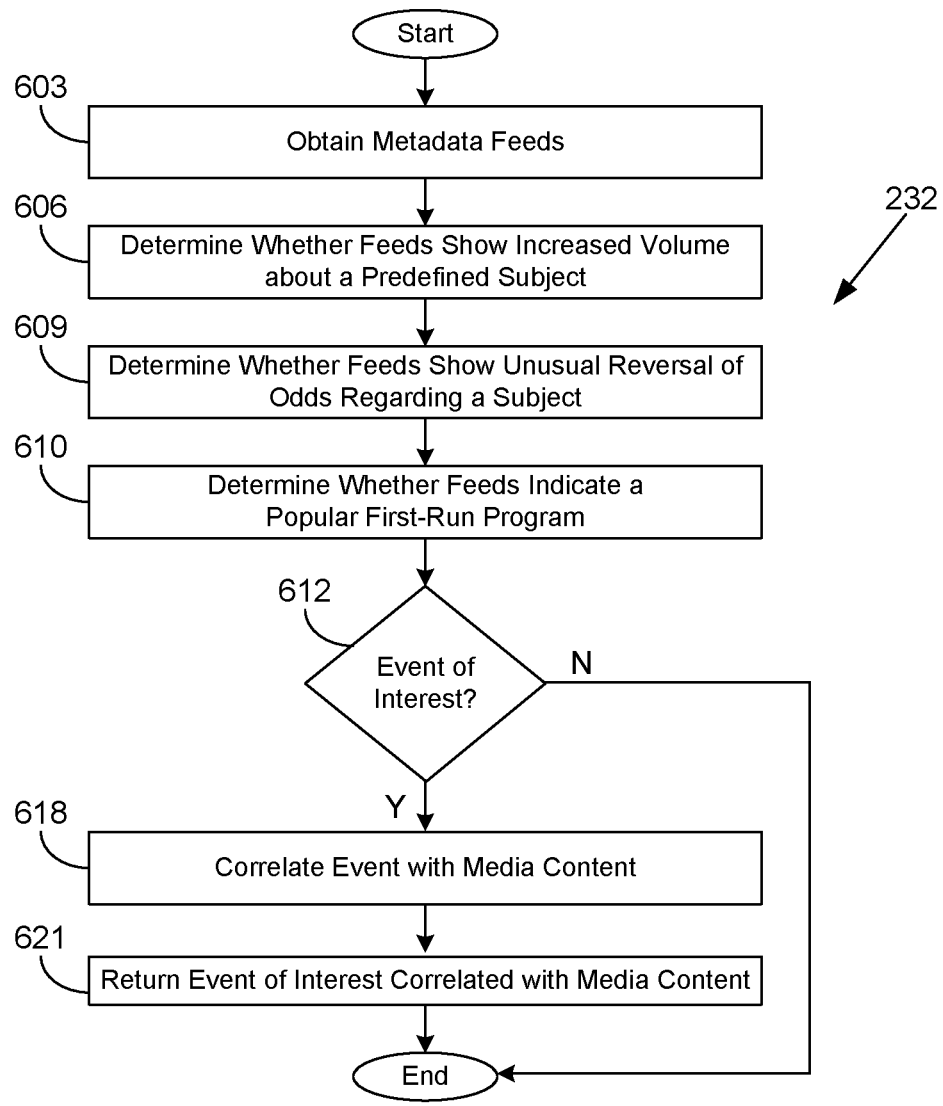
FIG. 6 is a flowchart illustrating one example of functionality implemented as portions of a metadata analysis engine executed in a computing environment in the networked environment of FIG. 2 according to various embodiments of the present disclosure.

Turning now to FIG. 6, shown is a flowchart that provides one example of the operation of a portion of the metadata analysis engine 232 according to various embodiments. It is understood that the flowchart of FIG. 6 provides merely an example of the many different types of functional arrangements that may be employed to implement the operation of the portion of the metadata analysis engine 232 as described herein. As an alternative, the flowchart of FIG. 6 may be viewed as depicting an example of elements of a method implemented in the computing environment 203 (FIG. 2) according to one or more embodiments.

Beginning with box 603, the metadata analysis engine 232 obtains one or more metadata feeds 233 (FIG. 2). In box 606, the metadata analysis engine 232 analyzes one or more metadata feeds 233 to determine whether they show an increased volume about a predefined subject, which could indicate an event of interest 228 (FIG. 2). For example, if the name of a program is suddenly referenced in many social media posts meeting a threshold within a relatively short time frame, an event of interest 228 may be occurring.

In box 609, the metadata analysis engine 232 analyzes one or more metadata feeds 233 to determine whether they show an unusual reversal of odds (e.g., as defined with reference to thresholds) regarding a subject, such as a sports event. In box 610, the metadata analysis engine 232 analyzes one or more metadata feeds 233 to determine whether they show that a popular first-run program is being broadcast, which may be worthy of constituting an event of interest 228.

In box 612, the metadata analysis engine 232 determines whether an event of interest 228 has been identified. This determination may be with reference to various thresholds and weighted combinations as specified in the event identification configuration data 251 (FIG. 2). If the metadata analysis engine 232 determines that an event of interest 228 is found, the metadata analysis engine 232 correlates the event of interest 228 with a specific time or period of time in media content in box 618. In box 621, the metadata analysis engine 232 returns the event of interest 228 correlated with the media content. Thereafter, the operation of the portion of the metadata analysis engine 232 ends.

Figure 7:
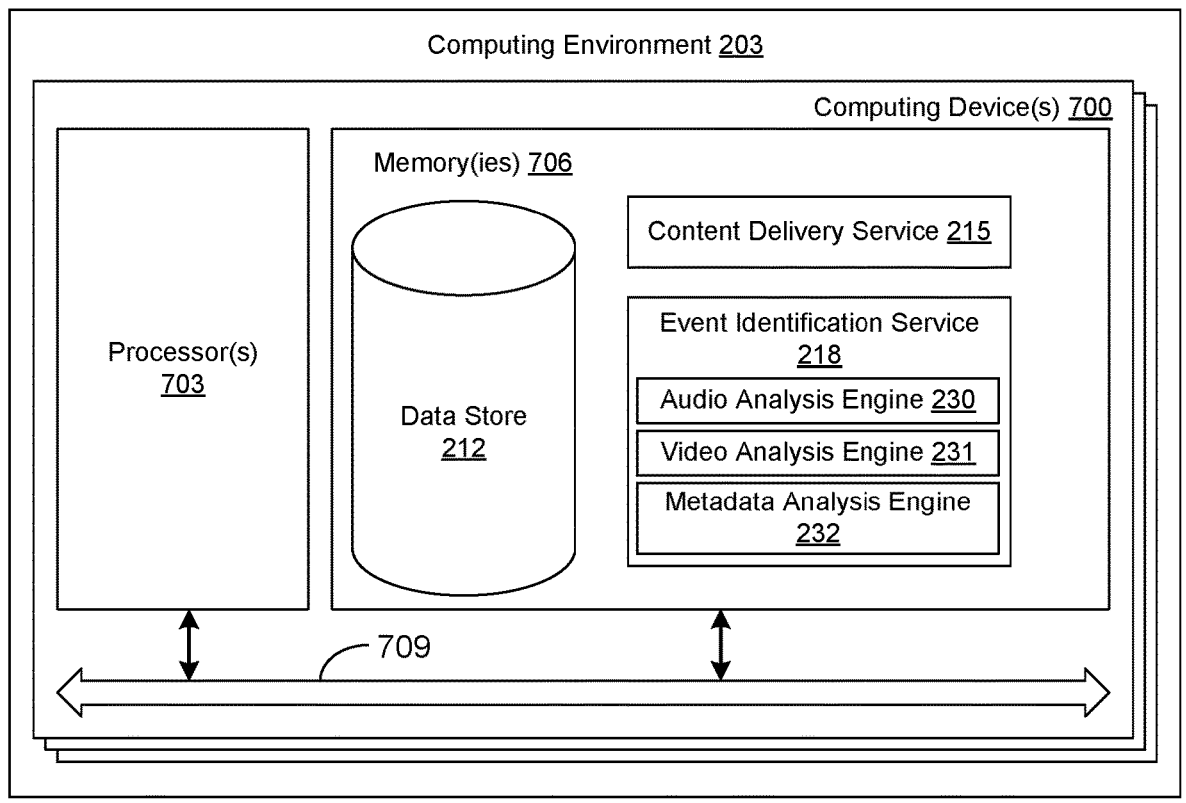
FIG. 7 is a schematic block diagram that provides one example illustration of a computing environment employed in the networked environment of FIG. 2 according to various embodiments of the present disclosure.

With reference to FIG. 7, shown is a schematic block diagram of the computing environment 203 according to an embodiment of the present disclosure. The computing environment 203 includes one or more computing devices 700. Each computing device 700 includes at least one processor circuit, for example, having a processor 703 and a memory 706, both of which are coupled to a local interface 709. To this end, each computing device 700 may comprise, for example, at least one server computer or like device. The local interface 709 may comprise, for example, a data bus with an accompanying address/control bus or other bus structure as can be appreciated.

Stored in the memory 706 are both data and several components that are executable by the processor 703. In particular, stored in the memory 706 and executable by the processor 703 are the content delivery service 215, the event identification service 218, the audio analysis engine 230, the video analysis engine 231, the metadata analysis engine 232, and potentially other applications. Also stored in the memory 706 may be a data store 212 and other data. In addition, an operating system may be stored in the memory 706 and executable by the processor 703.

It is understood that there may be other applications that are stored in the memory 706 and are executable by the processor 703 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 706 and are executable by the processor 703. In this respect, the term "executable" means a program file that is in a form that can ultimately be run by the processor 703. Examples of executable programs may be, for example, a compiled program that can be translated into machine code in a format that can be loaded into a random access portion of the memory 706 and run by the processor 703, source code that may be expressed in proper format such as object code that is capable of being loaded into a random access portion of the memory 706 and executed by the processor 703, or source code that may be interpreted by another executable program to generate instructions in a random access portion of the memory 706 to be executed by the processor 703, etc. An executable program may be stored in any portion or component of the memory 706 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 706 is defined herein as including both volatile and nonvolatile memory and data storage components. Volatile components are those that do not retain data values upon loss of power. Nonvolatile components are those that retain data upon a loss of power. Thus, the memory 706 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 703 may represent multiple processors 703 and/or multiple processor cores and the memory 706 may represent multiple memories 706 that operate in parallel processing circuits, respectively. In such a case, the local interface 709 may be an appropriate network that facilitates communication between any two of the multiple processors 703, between any processor 703 and any of the memories 706, or between any two of the memories 706, etc. The local interface 709 may comprise additional systems designed to coordinate this communication, including, for example, performing load balancing. The processor 703 may be of electrical or of some other available construction.

Although the content delivery service 215, the event identification service 218, the audio analysis engine 230, the video analysis engine 231, the metadata analysis engine 232, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 3-6 show the functionality and operation of an implementation of portions of the event identification service 218, the audio analysis engine 230, the video analysis engine 231, and the metadata analysis engine 232. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 703 in a computer system or other system. The machine code may be converted from the source code, etc. If embodied in hardware, each block may represent a circuit or a number of interconnected circuits to implement the specified logical function(s).

Although the flowcharts of FIGS. 3-6 show a specific order of execution, it is understood that the order of execution may differ from that which is depicted. For example, the order of execution of two or more blocks may be scrambled relative to the order shown. Also, two or more blocks shown in succession in FIGS. 3-6 may be executed concurrently or with partial concurrence. Further, in some embodiments, one or more of the blocks shown in FIGS. 3-6 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the content delivery service 215, the event identification service 218, the audio analysis engine 230, the video analysis engine 231, and the metadata analysis engine 232, that comprises software or code can be embodied in any non-transitory computer-readable medium for use by or in connection with an instruction execution system such as, for example, a processor 703 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the content delivery service 215, the event identification service 218, the audio analysis engine 230, the video analysis engine 231, and the metadata analysis engine 232, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device, or in multiple computing devices in the same computing environment 203.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A method, comprising:
 comparing, by at least one computing device, a video content stream to at least one other video content stream to determine that at least a predefined number of video content streams contain at least one of: a same video content or a similar video content;
 comparing, by the at least one computing device, the video content stream to a predefined video profile, the predefined video profile including one or more profiles of images that correspond to one or more known types of events of interest;

extracting, by the at least one computing device, text displayed in the video content stream;

determining, by the at least one computing device, a presentation style of the text in the video content stream;

determining, by the at least one computing device, that the text indicates an event of interest is occurring in real-time based at least in part on content of the text and the presentation style; and generating, by the at least one computing device, instructions that cause a client device to render a user interface that includes at least two concurrently visible options to begin viewing video content corresponding to the event of interest, wherein the at least two concurrently visible options comprise a first option that when selected causes the video content stream to be displayed in progress and a second option that when selected causes the video content stream to be displayed beginning at a point relative to the event of interest.

2. The method of claim 1, wherein the user interface further includes a thumbnail image of the video content stream corresponding to the event of interest.

3. The method of claim 2, further comprising causing, by the at least one computing device, the user interface to be rendered for display overlapping a portion of a different video content stream.

4. The method of claim 1, wherein the at least two concurrently visible options further comprise a third option that when selected causes the video content stream to be displayed starting at a beginning of a current program.

5. A system, comprising:

at least one computing device; and at least one application executable in the at least one computing device, wherein when executed the at least one application causes the at least one computing device to at least:

analyze video of a media content stream to determine whether an event of interest is occurring in real-time;

determine that the event of interest is occurring in real-time;

generate a user interface that includes at least two concurrently visible options to begin viewing video content corresponding to the event of interest, the user interface further including a thumbnail image of the video content corresponding to the event of interest, wherein the at least two concurrently visible options comprise a first option that when selected causes the media content stream to be displayed in progress and a second option that when selected causes the media content stream to be displayed beginning at a point relative to the event of interest; and cause the user interface to be rendered for display overlapping a portion of different video of a different media content stream.

6. The system of claim 5, wherein analyzing the video of the media content stream further comprises determining whether text displayed in the video indicates the event of interest based at least in part on a content of the text or a presentation style of the text.

7. The system of claim 6, wherein when executed the at least one application further causes the at least one computing device to at least determine whether the content of the text matching a predefined text of a profile associated with the event of interest.

8. The system of claim 5, wherein analyzing the video of the media content stream further comprises determining whether text displayed in the video indicates the event of interest based at least in part on the text meeting at least one threshold based at least in part on a size or a color of the text.

9. The system of claim 5, wherein analyzing the video of the media content stream further comprises determining by an image recognition analysis that an object depicted in the video matches a profile associated with the event of interest.

10. The system of claim 9, wherein the object is at least one of: a building, a vehicle, or a person.

11. The system of claim 5, wherein the media content stream is one of a plurality of media content streams, and analyzing the video of the media content stream comprises determining that at least a predefined number of the media content streams contain at least one of: a same video content or a similar video content.

12. The system of claim 5, wherein analyzing the video of the media content stream further comprises detecting a location related to a topic of interest.

13. The system of claim 5, wherein analyzing the video of the media content stream further comprises determining by a facial recognition analysis that a certain person is shown or interviewed in the video.

14. The system of claim 5, wherein analyzing the video of the media content stream further comprises determining a lighting or a camera pattern based at least in part on the video.

15. A method, comprising:

analyzing, by at least one computing device, video of a media content stream to determine whether an event of interest is occurring in real-time;

in response to determining that the event of interest is occurring in real-time, generating, by the at least one computing device, a user interface that includes at least two concurrently visible options to begin viewing video content corresponding to the event of interest, the user interface further including a thumbnail image of the video content corresponding to the event of interest, wherein the at least two concurrently visible options comprise a first option that when selected causes the media content stream to be displayed in progress and a second option that when selected causes the media content stream to be displayed beginning at a point relative to the event of interest; and causing, by the at least one computing device, the user interface to be rendered for display overlapping a portion of different video of a different media content stream.

16. The method of claim 15, wherein analyzing the video of the media content stream further comprises determining, by the at least one computing device, whether text displayed in the video indicates the event of interest based at least in part on a content of the text.

17. The method of claim 15, wherein analyzing the video of the media content stream further comprises determining, by the at least one computing device, whether text displayed in the video indicates the event of interest based at least in part on a presentation style of the text.

18. The method of claim 15, wherein analyzing the video of the media content stream further comprises determining, by the at least one computing device, whether the video of the media content stream matches a predefined video profile.

19. The method of claim 15, wherein analyzing the video of the media content stream further comprises determining, by the at least one computing device, that an object depicted in the video matches a profile associated with the event of interest.

20. The method of claim 15, further comprising sending, by the at least one computing device, a notification regarding the event of interest and an availability of a cached media content stream.

* * * * *